United States Patent
Liu et al.

(10) Patent No.: US 10,573,862 B2
(45) Date of Patent: Feb. 25, 2020

(54) BATTERY MODULE

(71) Applicant: CONTEMPORARY AMPEREX TECHNOLOGY CO., LIMITED, Ningde (CN)

(72) Inventors: Hanxiang Liu, Ningde (CN); Lin Zheng, Ningde (CN); Derong Wang, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 134 days.

(21) Appl. No.: 15/730,498

(22) Filed: Oct. 11, 2017

(65) Prior Publication Data
US 2018/0108889 A1  Apr. 19, 2018

(30) Foreign Application Priority Data
Oct. 14, 2016 (CN) .................... 2016 2 1122247 U

(51) Int. Cl.
| | |
|---|---|
| H01M 2/10 | (2006.01) |
| H01M 2/20 | (2006.01) |
| H01M 2/34 | (2006.01) |
| H01M 2/30 | (2006.01) |
| H01M 10/04 | (2006.01) |
| H01M 10/14 | (2006.01) |
| H01M 10/42 | (2006.01) |

(52) U.S. Cl.
CPC .......... *H01M 2/1077* (2013.01); *H01M 2/20* (2013.01); *H01M 2/30* (2013.01); *H01M 2/34* (2013.01); *H01M 2/348* (2013.01); *H01M 10/04* (2013.01); *H01M 10/14* (2013.01); *H01M 10/425* (2013.01)

(58) Field of Classification Search
None
See application file for complete search history.

(56) References Cited

U.S. PATENT DOCUMENTS

2014/0315052 A1* 10/2014 Byun .................. H01M 2/34
429/61
2016/0260956 A1*  9/2016 Jang ................... H01M 2/34

FOREIGN PATENT DOCUMENTS

CN        204946982 U  *  1/2016
CN        204946982 U     1/2016

* cited by examiner

*Primary Examiner* — Daniel S Gatewood
(74) *Attorney, Agent, or Firm* — Morgan, Lewis & Bockius LLP

(57) ABSTRACT

The present disclosure provides a battery module, which comprises: a plurality of mono-batteries, each mono-battery has electrode terminals which are opposite in electrical polarity; and an electrical connection sheet connecting at least two corresponding electrode terminals, the electrical connection sheet is formed with at least one fusing portion, each fusing portion is positioned between two adjacent electrode terminals. The battery module further comprises: an insulating sheet supported on the fusing portion which is positioned between the two adjacent electrode terminals connected by the electrical connection sheet, when the fusing portion supporting the insulating sheet is fused and a fracturing slit is formed, the insulating sheet drops into the fracturing slit to electrically isolate two facing sides of the electrical connection sheet which are at the fracturing slit. Therefore it avoids the phenomenon of an electrical arc occurring at the fracturing slit and makes the electrical arc extinct.

11 Claims, 22 Drawing Sheets

BATTERY MODULE

REFERENCE TO RELATED APPLICATIONS

The present application claims priority to Chinese patent application No. 201621122247.1, filed on Oct. 14, 2016, which is incorporated herein by reference in its entirety.

FIELD OF THE PRESENT DISCLOSURE

The present disclosure relates to the field of power battery technology, and particularly relates to a battery module.

BACKGROUND OF THE PRESENT DISCLOSURE

The security problem of power battery is a factor effecting the development of power battery, increasing the safety protective design of a power battery system to the maximum extent always is the direction of people's efforts. The fuse function of the existing power battery system is provided inside a power management system or a battery module, the electrical connection between mono-batteries most uses an electrical connection sheet of metal, but the electrical connection between mono-batteries are not provided with the fuse function; if increasing the fuse function in the electrical connection between mono-batteries, when the battery module fails and generates a large current which is hazardous, the large current flows through the electrical connection sheet which is between the mono-batteries and makes the electrical connection sheet fused and form a fracturing slit, when the fracturing slit is narrower, the phenomenon of electrical arc easily occurs, if the electrical arc is not extinct in time, the electrical spark generated by the electrical arc may damage the other parts of the battery module and the mono-batteries, and even fire explosion may be caused if the electrical spark is serious.

SUMMARY OF THE PRESENT DISCLOSURE

In view of the problem existing in the background, an object of the present disclosure is to provide a battery module, which can avoid the phenomenon of electrical arc occurring and makes the electrical arc extinct.

In order to achieve the above object, the present disclosure provides a battery module, which comprises: a plurality of mono-batteries arranged side by side, each mono-battery has electrode terminals which are opposite in electrical polarity; and an electrical connection sheet connecting at least two corresponding electrode terminals, the electrical connection sheet is formed with at least one fusing portion, each fusing portion is positioned between two adjacent electrode terminals connected by the electrical connection sheet. The battery module further comprises: an insulating sheet supported on the fusing portion which is positioned between the two adjacent electrode terminals connected by the electrical connection sheet, when the fusing portion supporting the insulating sheet is fused and a fracturing slit is formed, the insulating sheet drops into the fracturing slit to electrically isolate two facing sides of the electrical connection sheet which are at the fracturing slit.

The present disclosure has the following beneficial effects: after the battery module of the present disclosure have been assembled, when the battery module occurs accidents, such as short circuit and the like, the circuit of the battery module generates a large current which is hazardous, when the large current flows through the fusing portion of the electrical connection sheet, the fusing portion of the electrical connection sheet is fused to form the fracturing slit. The insulating sheet supported on the fusing portion drops into the fracturing slit to electrically isolate the two facing sides of the fused electrical connection sheet which are at the fracturing slit, so as to avoid the phenomenon of an electrical arc occurring at the fracturing slit and make the electrical arc extinct.

Figure 1:
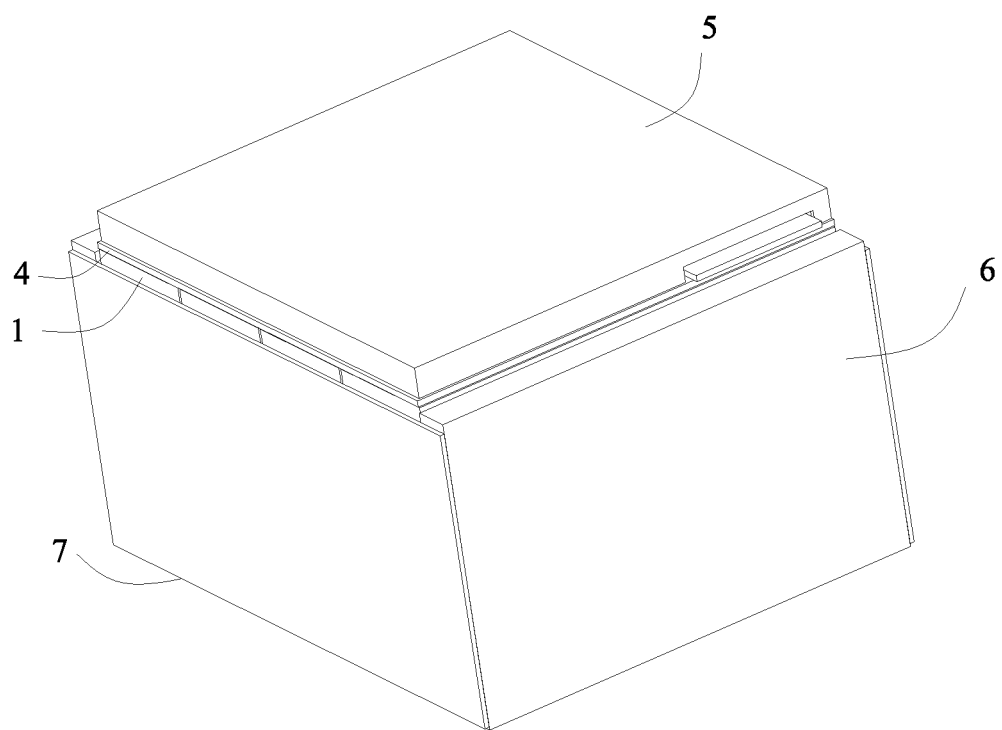
FIG. 1 is an assembled perspective view of a battery module according to the present disclosure.

Reference numerals are represented as follows:
1 mono-battery
11 electrode terminal
2 electrical connection sheet
21 fusing portion
22 through groove
3 insulating sheet
31 supported portion
32 protruding portion
4 insulating spacer
5 upper cover
51 receiving groove
6 frame
7 base plate
W width direction
L length direction
T thickness direction
B fracturing slit
C tooth

DETAILED DESCRIPTION

Hereinafter a battery module according to the present disclosure will be described in detail in combination with the figures.

Referring to FIG. 1 to FIG. 42, a battery module according to the present disclosure comprises: a plurality of mono-batteries 1 arranged side by side, each mono-battery 1 has electrode terminals 11 which are opposite in electrical polarity; and an electrical connection sheet 2 connecting at least two corresponding electrode terminals 11, the electrical connection sheet 2 is formed with at least one fusing portion 21, each fusing portion 21 is positioned between two adjacent electrode terminals 11 connected by the electrical connection sheet 2. The battery module further comprises: an insulating sheet 3 supported on the fusing portion 21 which is positioned between the two adjacent electrode terminals 11 connected by the electrical connection sheet 2, when the fusing portion 21 supporting the insulating sheet 3 is fused and a fracturing slit B is formed, the insulating sheet 3 drops into the fracturing slit B to electrically isolate two facing sides of the electrical connection sheet 2 which are at the fracturing slit B.

After the battery module of the present disclosure have been assembled, when the battery module occurs accidents, such as short circuit and the like, the circuit of the battery module generates a large current which is hazardous, when the large current flows through the fusing portion 21 of the electrical connection sheet 2, the fusing portion 21 of the electrical connection sheet 2 is fused to form the fracturing slit B. The insulating sheet 3 supported on the fusing portion 21 drops into the fracturing slit B to electrically isolate the two facing sides of the fused electrical connection sheet 2 which are at the fracturing slit B, so as to avoid the phenomenon of an electrical arc occurring at the fracturing slit B and make the electrical arc extinct.

Referring to FIG. 2 to FIG. 16, in an embodiment of the present disclosure, one insulating sheet 3 is provided between the two adjacent electrode terminals 11 connected by the electrical connection sheet 2, the insulating sheet 3 is supported on all the fusing portions 21 which are between the two adjacent electrode terminals 11 connected by the electrical connection sheet 2. When all the fusing portions 21 which are between the two adjacent electrode terminals 11 connected by the electrical connection sheet 2 are fused, the insulating sheet 3 drops into the fracturing slit B formed by all the fusing portions 21 which are between the two adjacent electrode terminals 11 connected by the electrical connection sheet 2.

Figure 2:
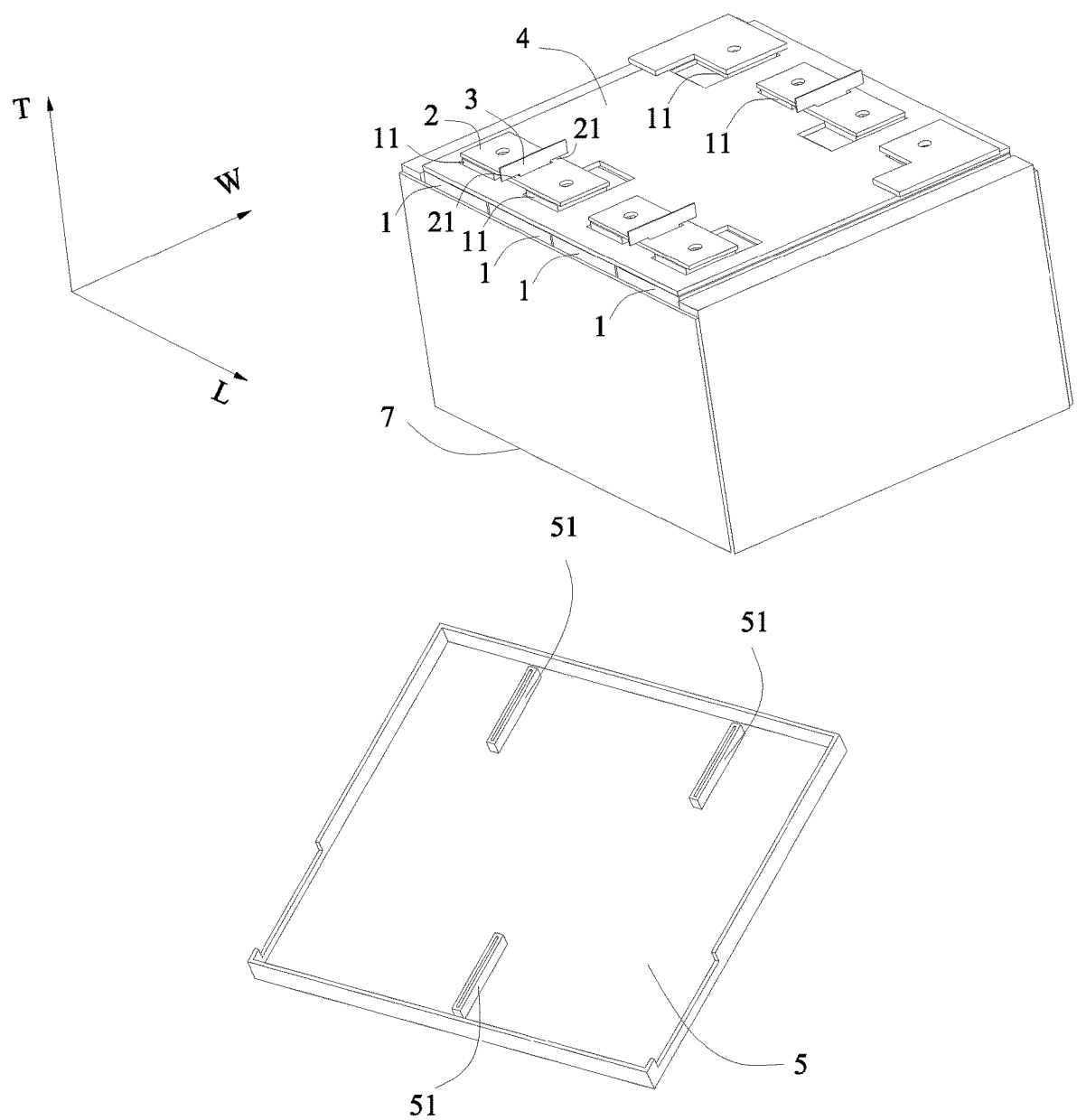
FIG. 2 is a partially exploded view of an embodiment of the battery module of FIG. 1, in which an upper cover of the battery module is separated.
Figure 3:
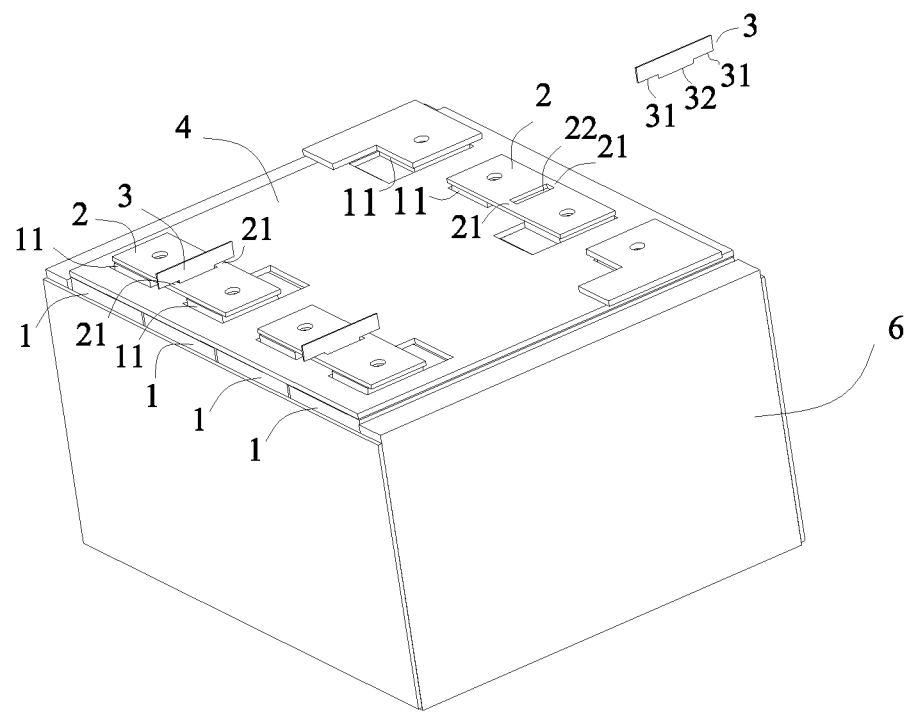
FIG. 3 is a further exploded view of the battery module of FIG. 2, in which one insulating sheet is removed from a corresponding electrical connection sheet.
Figure 4:
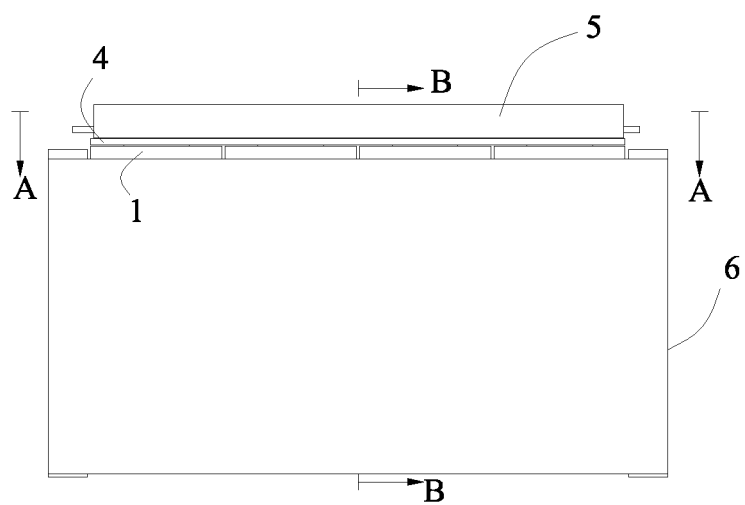
FIG. 4 is a front view of the embodiment of the battery module of FIG. 1.
Figure 5:
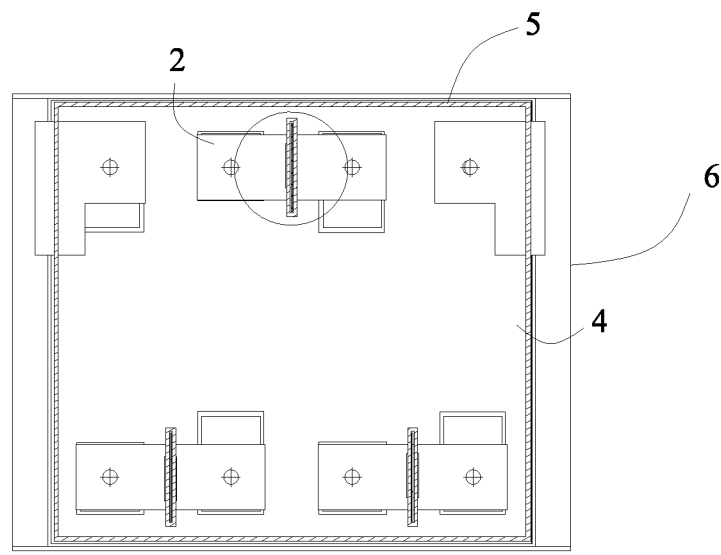
FIG. 5 is a cross sectional view taken along a A-A line of FIG. 4.
Figure 6:
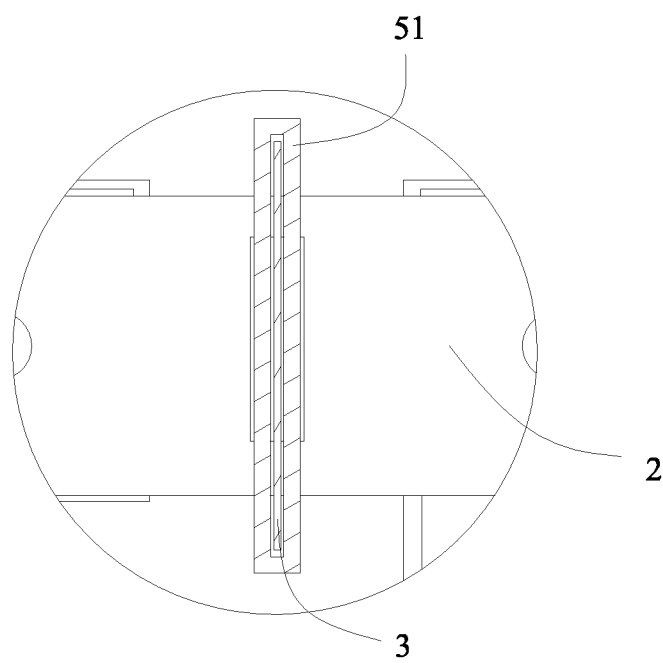
FIG. 6 is a partially enlarged view of a circle part of FIG. 5.
Figure 7:
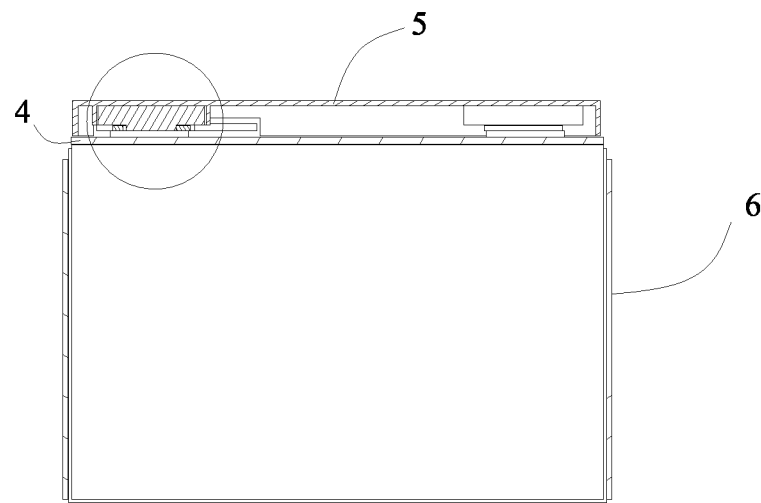
FIG. 7 is a cross sectional view taken along a B-B line of FIG. 4.
Figure 8:
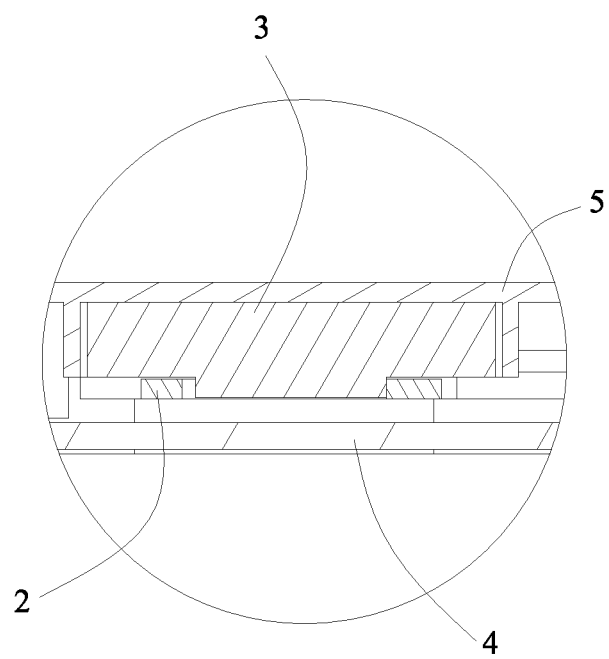
FIG. 8 is a partially enlarged view of a circle part of FIG. 7.
Figure 9:
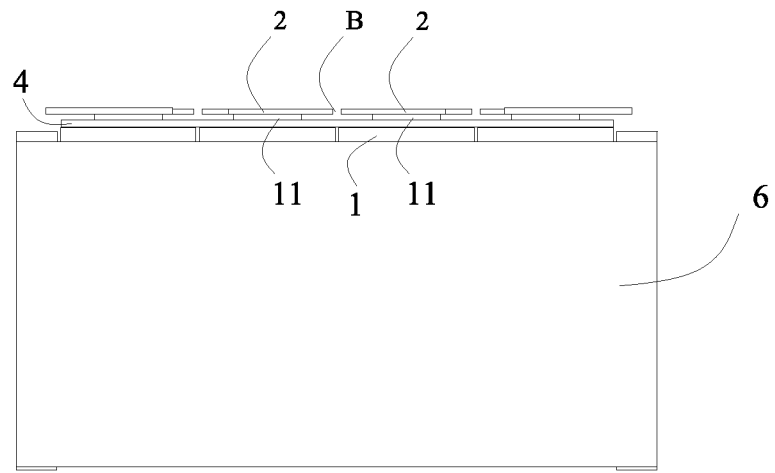
FIG. 9 is a front view of the embodiment of the battery module of the present disclosure, in which fusing portions of the electrical connection sheet have been fused and the insulating sheet and the upper cover are removed.
Figure 10:
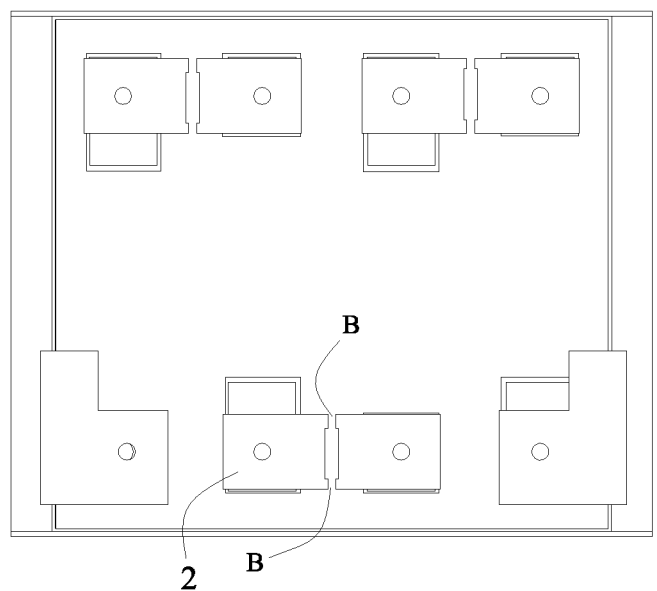
FIG. 10 is a top view of the embodiment of the battery module of the present disclosure, in which the fusing portions of the electrical connection sheet have been fused and the insulating sheet and the upper cover are removed.
Figure 11:
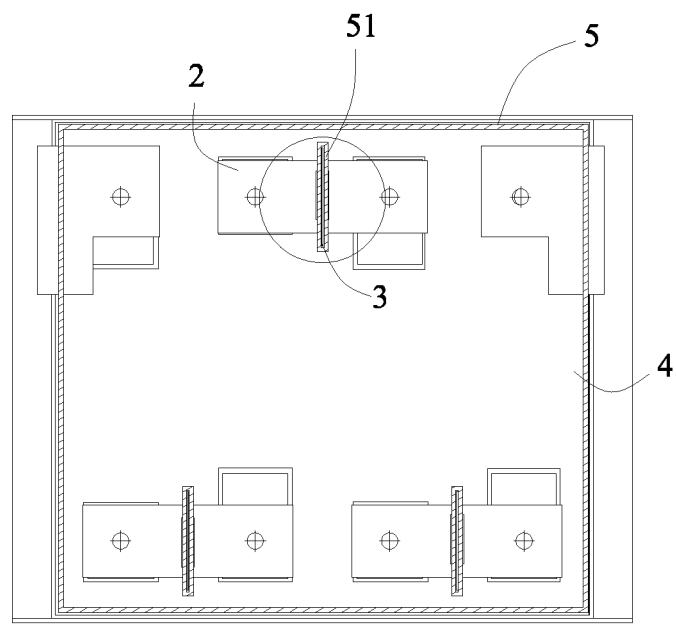
FIG. 11 is a cross sectional view corresponding to FIG. 5, in which the fusing portions of the electrical connection sheet of the embodiment of the battery module of the present disclosure have been fused.
Figure 12:
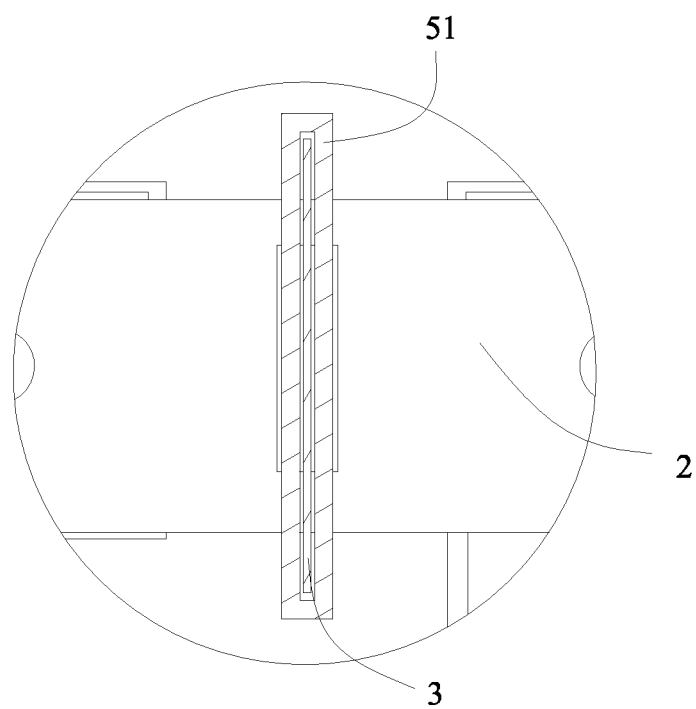
FIG. 12 is a partially enlarged view of a circle part of FIG. 11.
Figure 13:
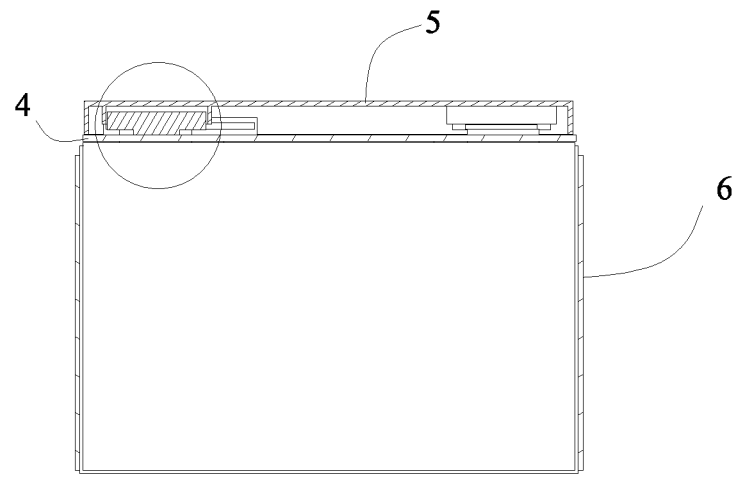
FIG. 13 is a cross sectional view corresponding to FIG. 7, in which the fusing portions of the electrical connection sheet of the embodiment of the battery module of the present disclosure have been fused.
Figure 14:
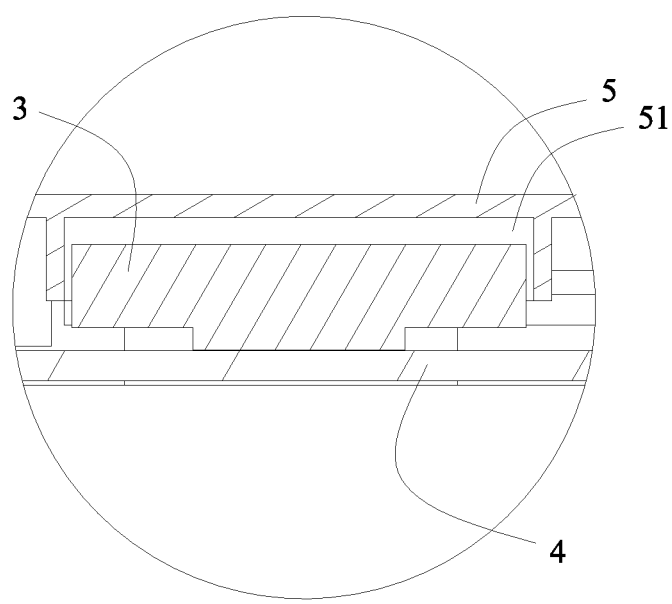
FIG. 14 is a partially enlarged view of a circle part of FIG. 13.
Figure 15:
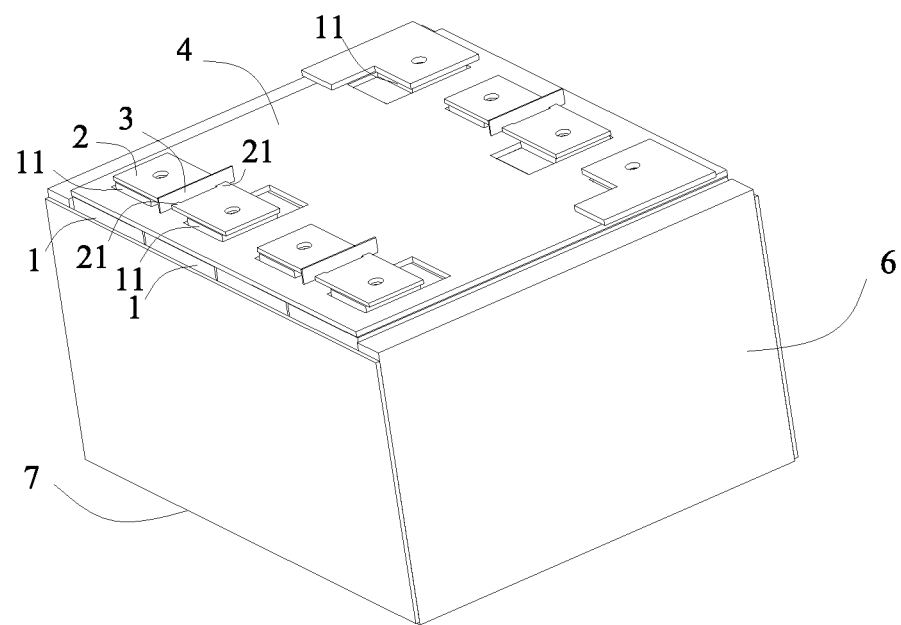
FIG. 15 is a perspective view of an embodiment of the battery module of the present disclosure, in which fusing portions of an electrical connection sheet have been fused and an upper cover is removed.
Figure 16:
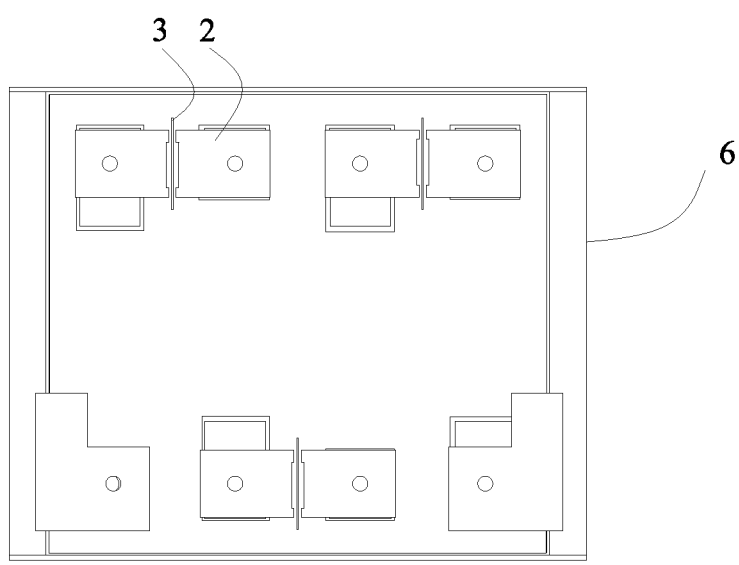
FIG. 16 is a top view of FIG. 15.
Figure 20:
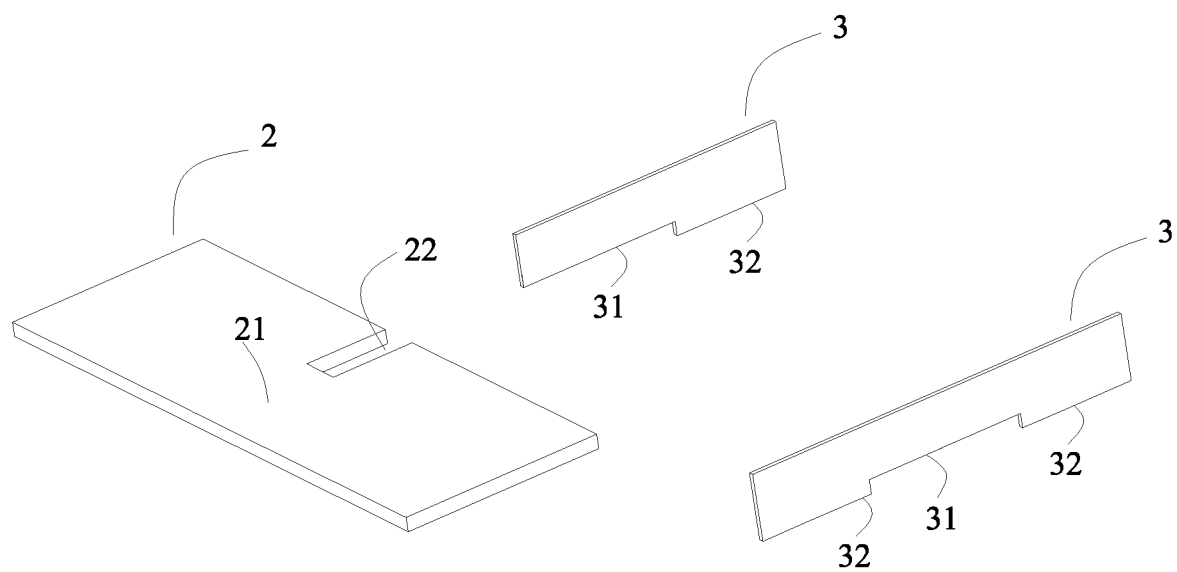
FIG. 20 is yet another varied example of the electrical connection sheet and the insulating sheet according to an embodiment of the present disclosure, in which two insulating sheets having different shapes are shown on the right.
Figure 21:
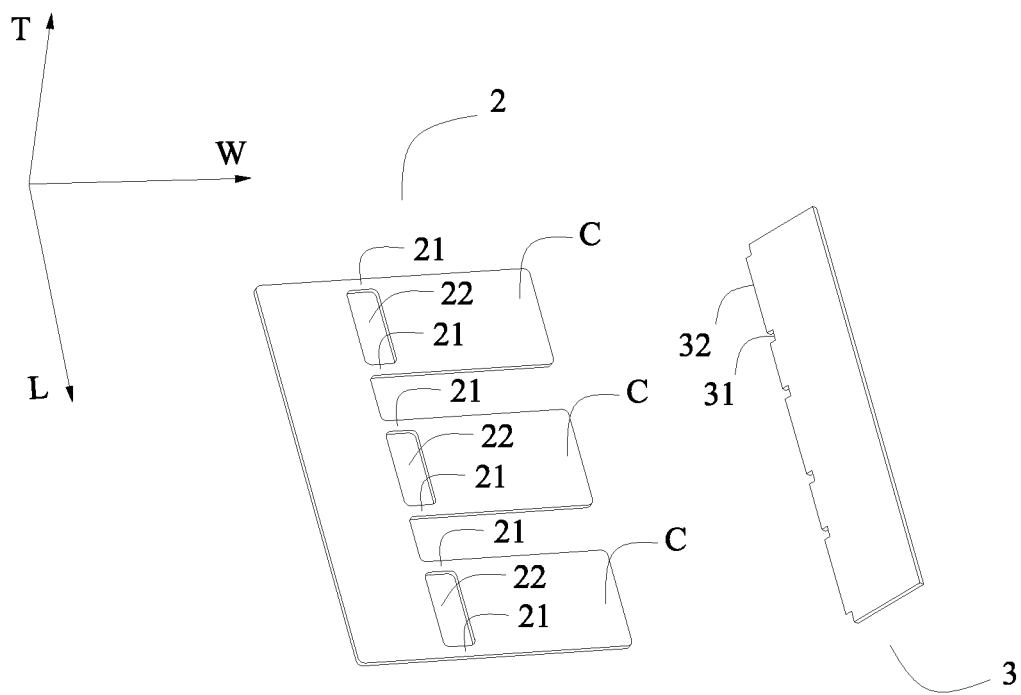
FIG. 21 is still another varied example of the electrical connection sheet and the insulating sheet according to an embodiment of the present disclosure, in which the electrical connection sheet has a comb shape.
Figure 22:
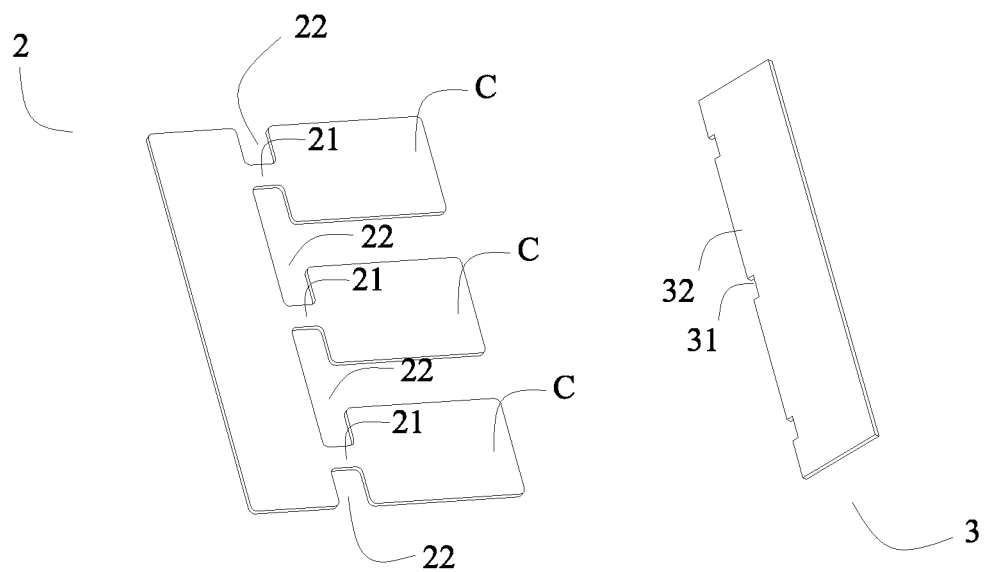
FIG. 22 is a variant of FIG. 21.

As shown in FIG. 2, FIG. 3 and FIG. 20, the electrical connection sheet 2 is provided with a through groove 22 which is adjacent to the fusing portion 21 and between the two adjacent electrode terminals 11 connected by the electrical connection sheet 2, the through groove 22 extends along a width direction W of the electrical connection sheet 2 and passes through the electrical connection sheet 2 along a thickness direction T of the electrical connection sheet 2. The insulating sheet 3 comprises: a supported portion 31 supported on the fusing portion 21 of the electrical connection sheet 2; and a protruding portion 32 protruding downwardly relative to the supported portion 31 and inserting into the through groove 22 of the electrical connection sheet 2.

Figure 17:
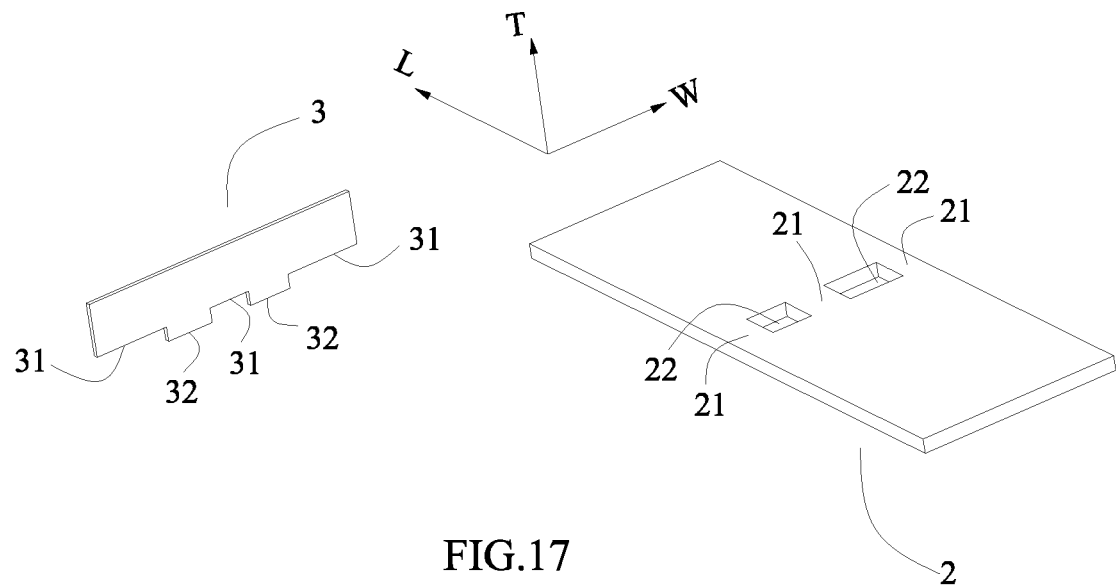
FIG. 17 is a varied example of the electrical connection sheet and the insulating sheet according to an embodiment of the present disclosure.
Figure 18:
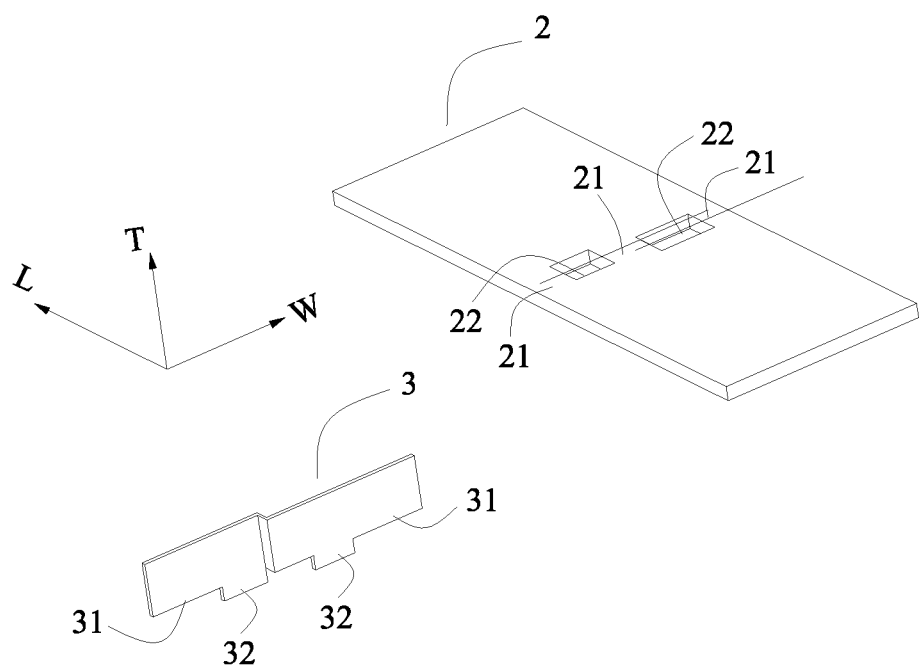
FIG. 18 is a varied example of the insulating sheet of FIG. 17.
Figure 19:
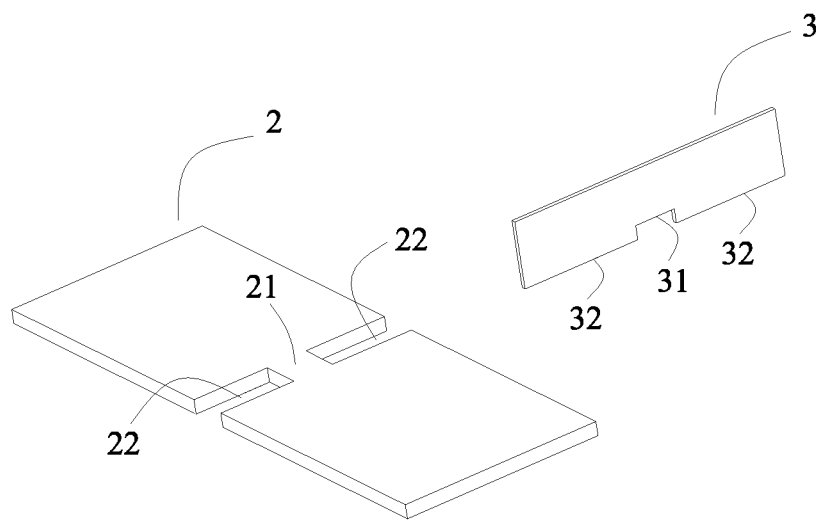
FIG. 19 is another varied example of the electrical connection sheet and the insulating sheet according to an embodiment of the present disclosure.

When the through groove 22 of the electrical connection sheet 2 is provided as at least two in number, all the through grooves 22 of the electrical connection sheet 2 are provided in position so that central axes of all the through grooves 22 are coincident, as shown in FIG. 17, or all the through grooves 22 of the electrical connection sheet 2 are provided in position so that central axes of at least two through grooves 22 are not coincident, as shown in FIG. 18, and the electrical connection sheet 2 is correspondingly changed in shape so as to adapt with non-coincidence of the central axes of the through grooves 22.

Referring to FIG. 23 to FIG. 37, in another embodiment of the present disclosure, a plurality of insulating sheets 3 are provided between the two adjacent electrode terminals 11 connected by the electrical connection sheet 2, each insulating sheet 3 is supported on one fusing portion 21 or a plurality of fusing portions 21 between the two adjacent electrode terminals 11 connected by the electrical connection sheet 2.

In this embodiment, the number of the insulating sheets 3 which are between the two adjacent electrode terminals 11 connected by the electrical connection sheet 2 is more than one but is not more than the number of the fusing portions 21 which are between the two adjacent electrode terminals 11 connected by the electrical connection sheet 2, the insulating sheet 3 and the fusing portions 21 between the two adjacent electrode terminals 11 connected by the electrical connection sheet 2 are provided by one-to-one corresponding relationship or are not provided by one-to-one corresponding relationship.

Specifically, when the insulating sheet 3 and the fusing portion 21 are provided by one-to-one corresponding relationship, referring to FIG. 23 to FIG. 29 and FIG. 32 to FIG. 37, one insulating sheet 3 is supported on one fusing portion 21 which is between the two adjacent electrode terminals 11 connected by the electrical connection sheet 2 and corresponds to the one insulating sheet 3, when the one fusing portion 21 which is between the two adjacent electrode terminals 11 connected by the electrical connection sheet 2 and corresponds to the one insulating sheet 3 is fused, the insulating sheet 3 drops into one fracturing slit B formed by the one fusing portion 21. When the insulating sheet 3 and the fusing portion 21 are not provided by one-to-one corresponding relationship, that is, one insulating sheet 3 may be supported on a plurality of fusing portions 21 at the same time, referring to FIG. 2 to FIG. 17, the one insulating sheet 3 is supported on the plurality of fusing portions 21 which are between the two adjacent electrode terminals 11 connected by the electrical connection sheet 2 and correspond to the insulating sheet 3, when the plurality of fusing portions 21 which are between the two adjacent electrode terminals 11 connected by the electrical connection sheet 2 and correspond to the insulating sheet 3 are fused, the plurality of fusing portions 21 which are between the two adjacent electrode terminals 11 connected by the electrical connection sheet 2 and correspond to the insulating sheet 3 form fracturing slits B and the insulating sheet 3 drops into the fracturing slits B respectively formed by the plurality of fusing portions 21.

Figure 23:
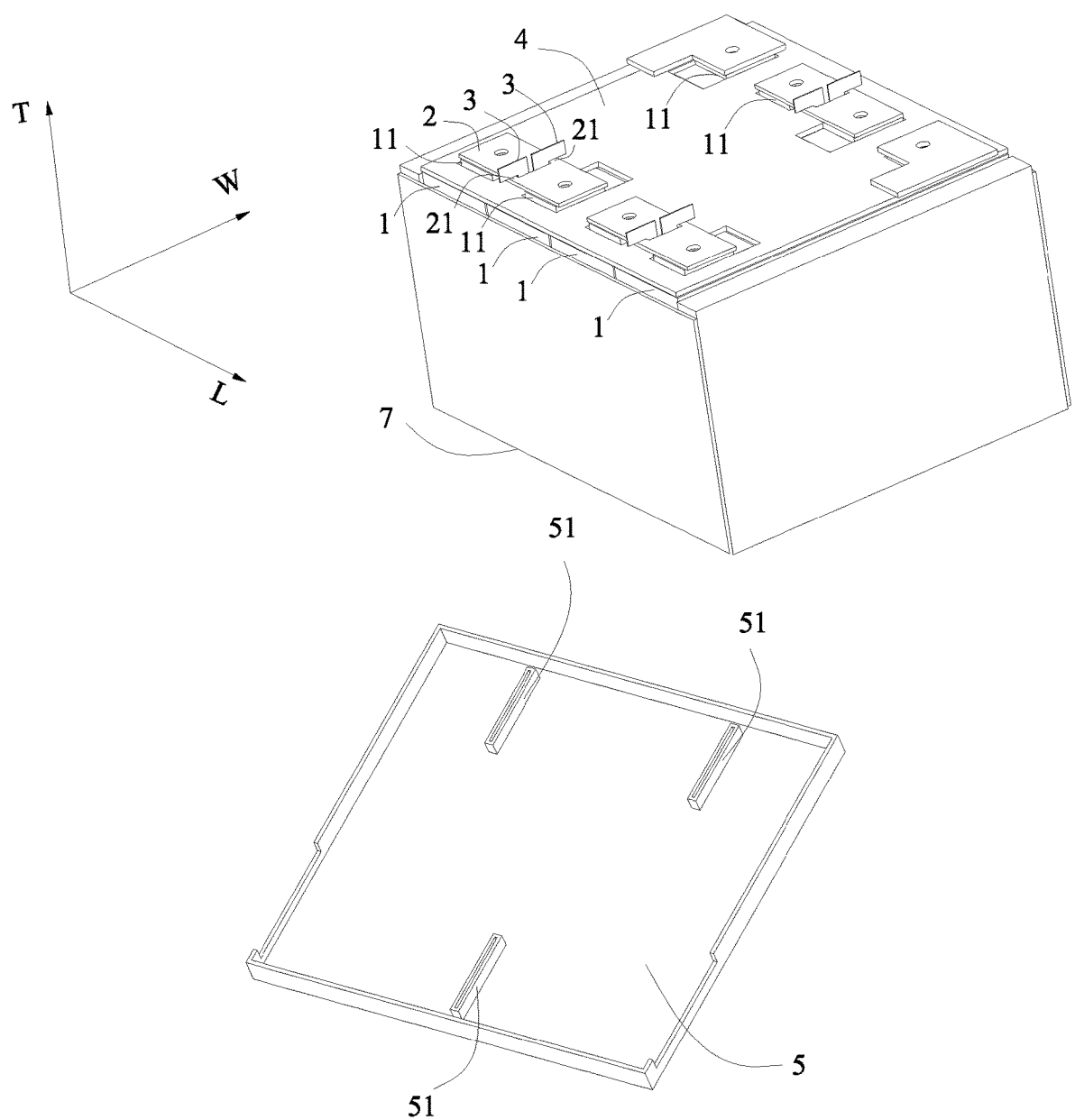
FIG. 23 is a partially exploded view of another embodiment of the battery module of FIG. 1, in which the upper cover of the battery module is separated.
Figure 24:
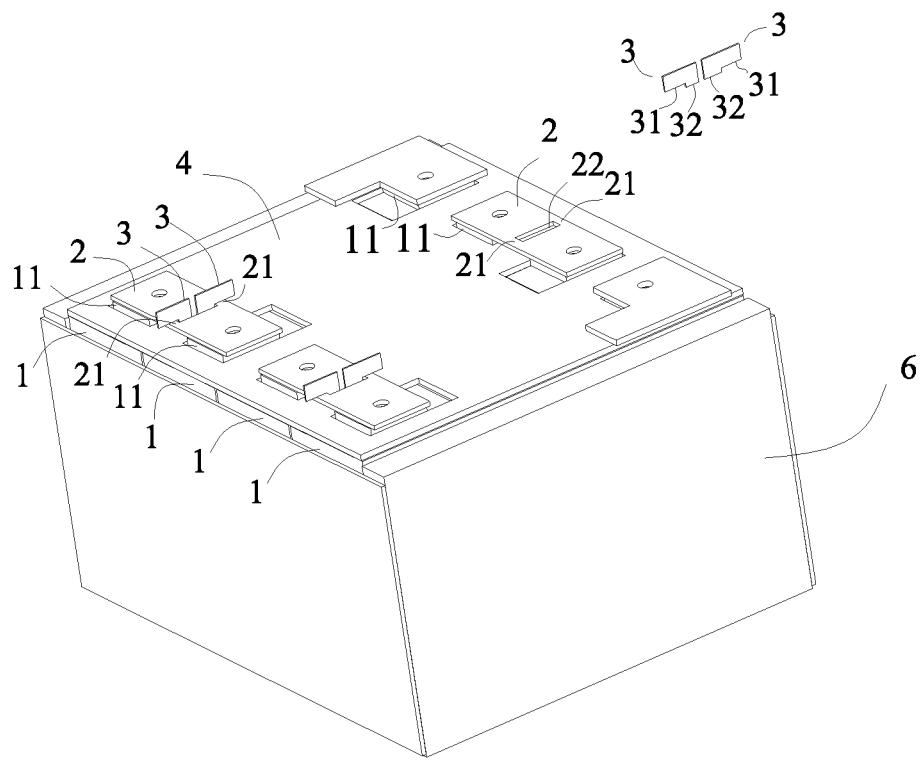
FIG. 24 is a further exploded view of FIG. 23, in which one insulating sheet is removed from a corresponding electrical connection sheet.
Figure 25:
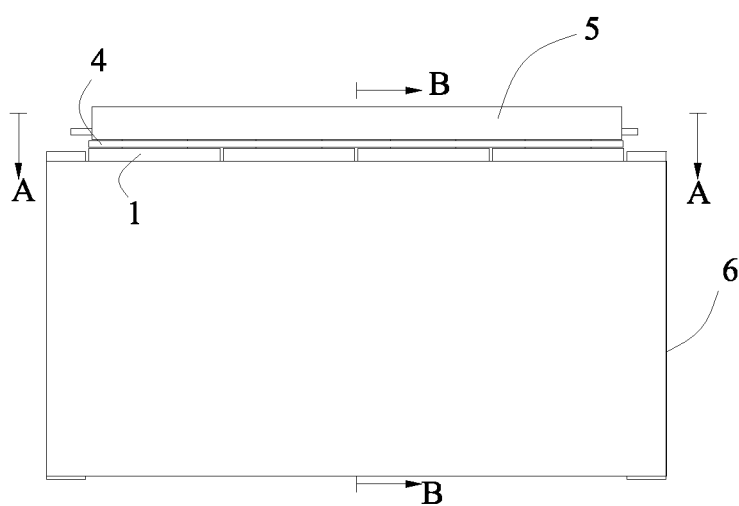
FIG. 25 is a front view of the another embodiment of the battery module of FIG. 1.
Figure 26:
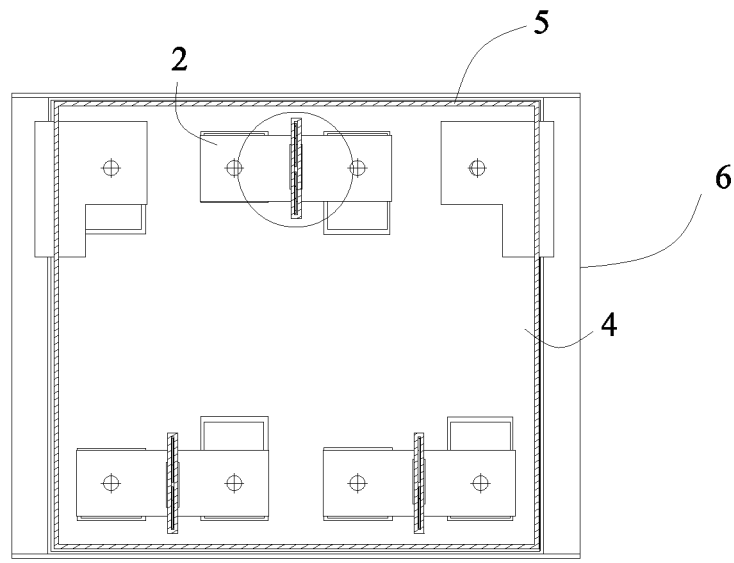
FIG. 26 is a cross sectional view taken along a A-A line of FIG. 25.
Figure 27:
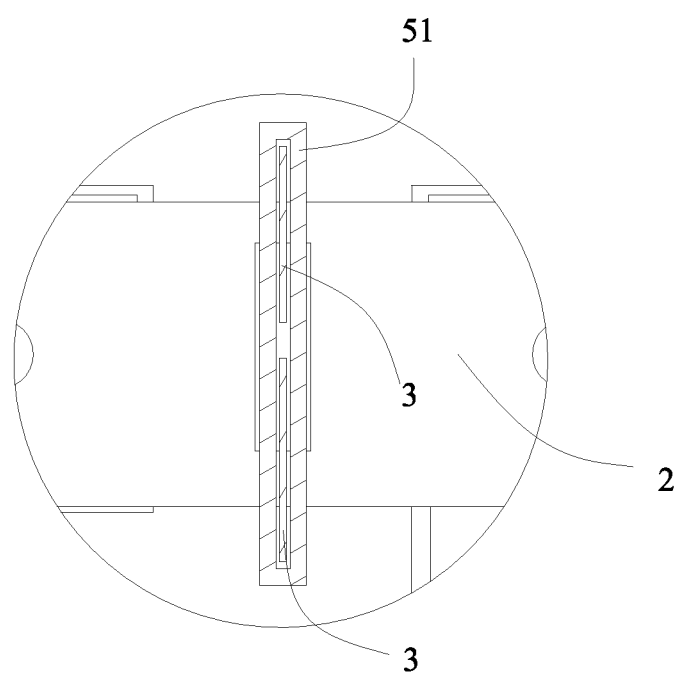
FIG. 27 is a partially enlarged view of a circle part of FIG. 26.
Figure 28:
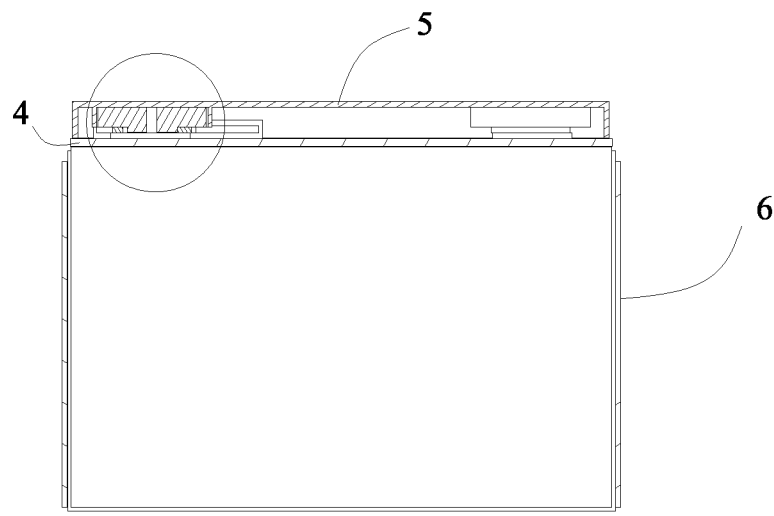
FIG. 28 is a cross sectional view taken along a B-B line of FIG. 25.
Figure 29:
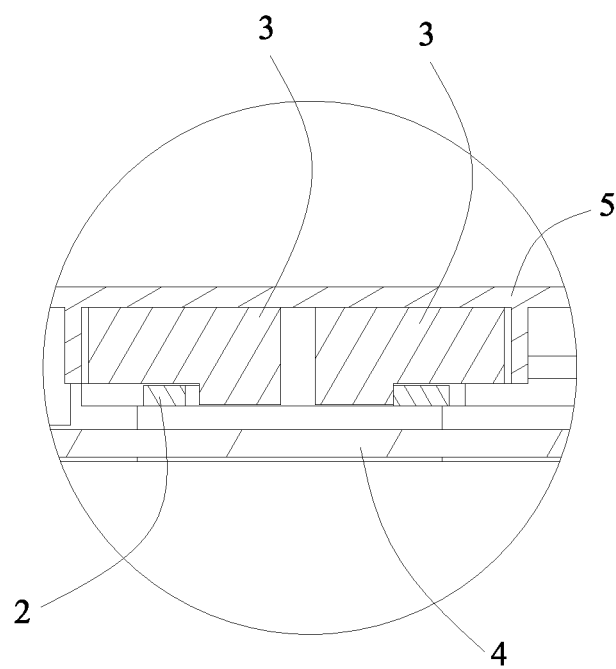
FIG. 29 is a partially enlarged view of a circle part of FIG. 28.
Figure 30:
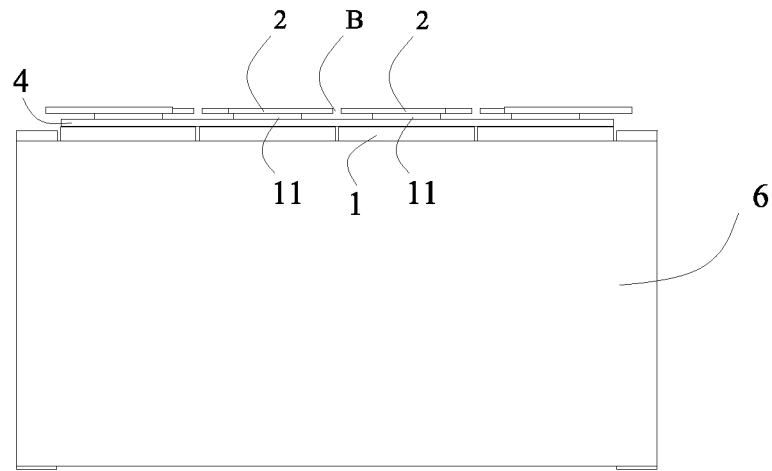
FIG. 30 is a front view of the another embodiment of the battery module of the present disclosure, in which fusing portions of the electrical connection sheet have been fused and the insulating sheet and the upper cover are removed.
Figure 31:
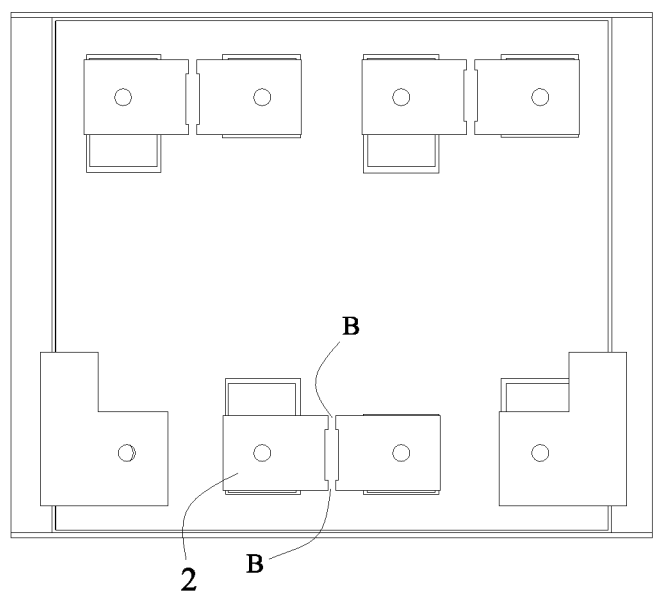
FIG. 31 is a top view of the another embodiment of the battery module of the present disclosure, in which the fusing portions of the electrical connection sheet have been fused and the insulating sheet and the upper cover are removed.
Figure 32:
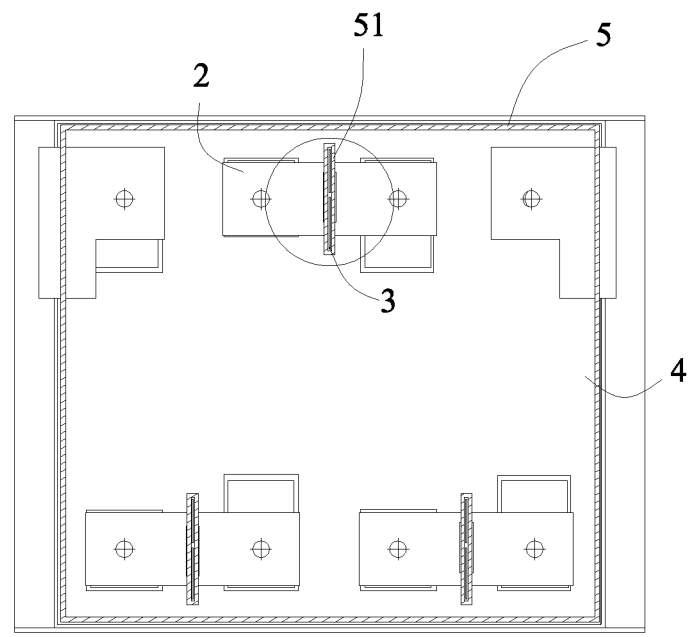
FIG. 32 is a cross sectional view corresponding to FIG. 26, in which the fusing portions of the electrical connection sheet of the another embodiment of the battery module of the present disclosure have been fused.
Figure 33:
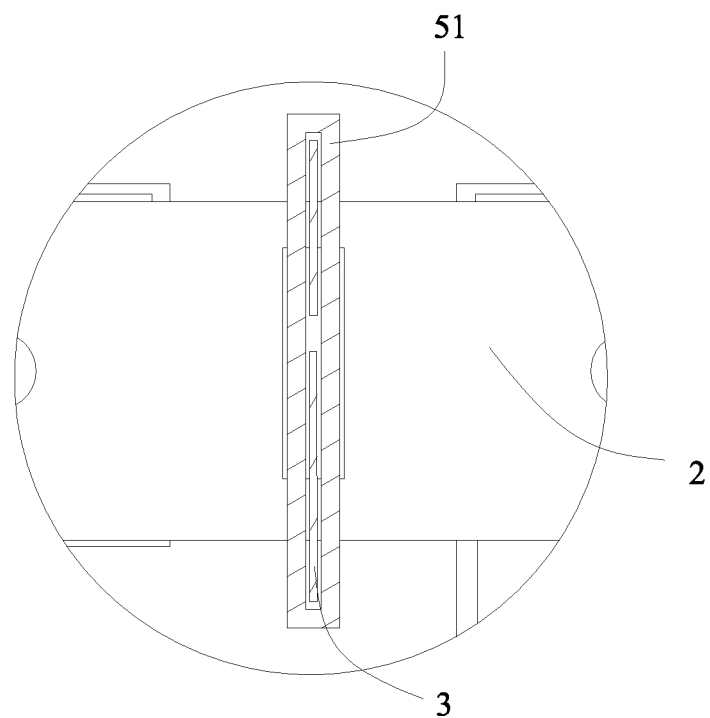
FIG. 33 is a partial enlarged view of a circle part of FIG. 32.
Figure 34:
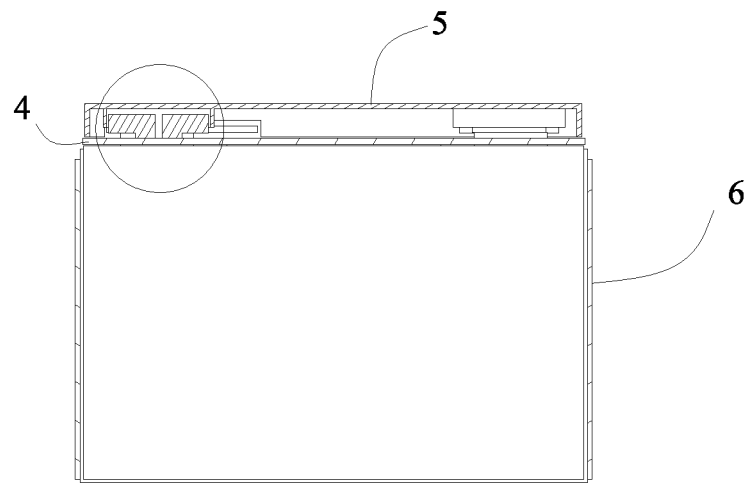
FIG. 34 is a cross sectional view corresponding to FIG. 28, in which the fusing portions of the electrical connection sheet of the another embodiment of the battery module of the present disclosure have been fused.
Figure 35:
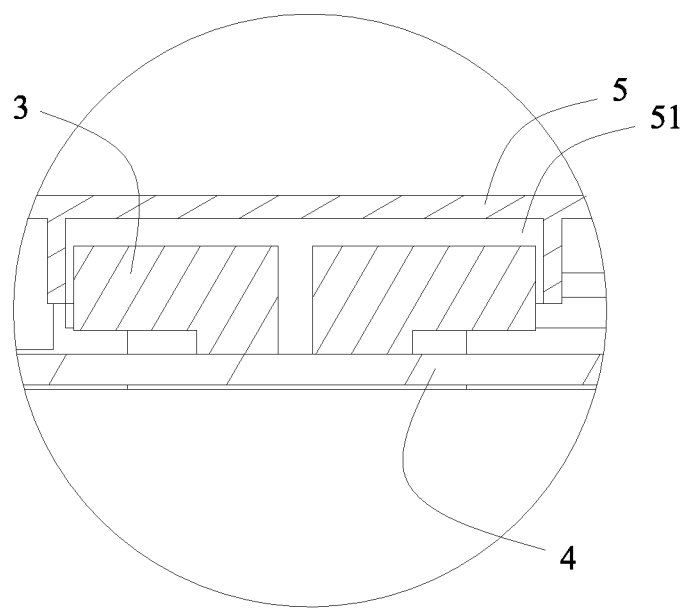
FIG. 35 is a partially enlarged view of a circle part of FIG. 34.
Figure 36:
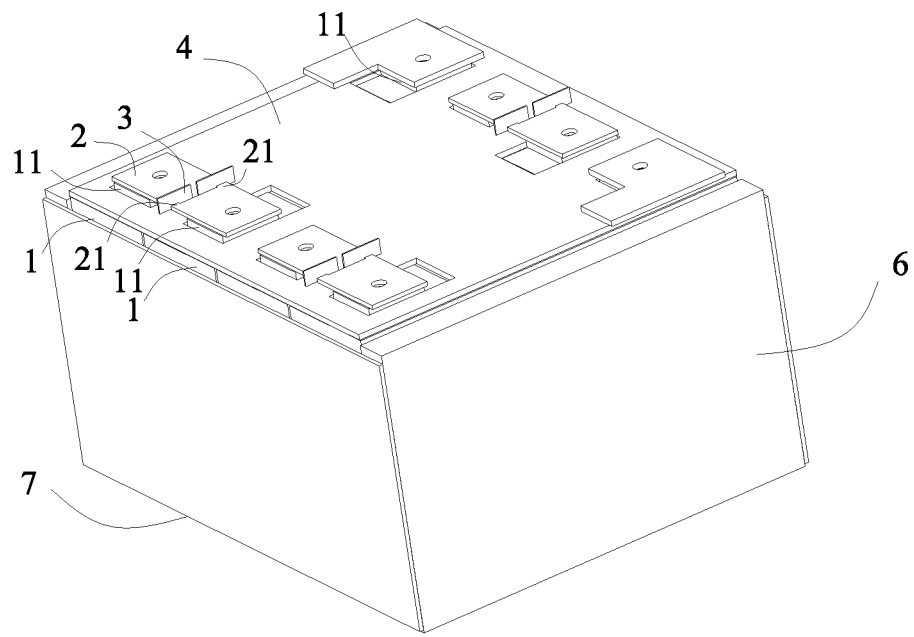
FIG. 36 is a perspective view of the another embodiment of the battery module of the present disclosure, in which the fusing portions of the electrical connection sheet have been fused and the upper cover is removed.
Figure 37:
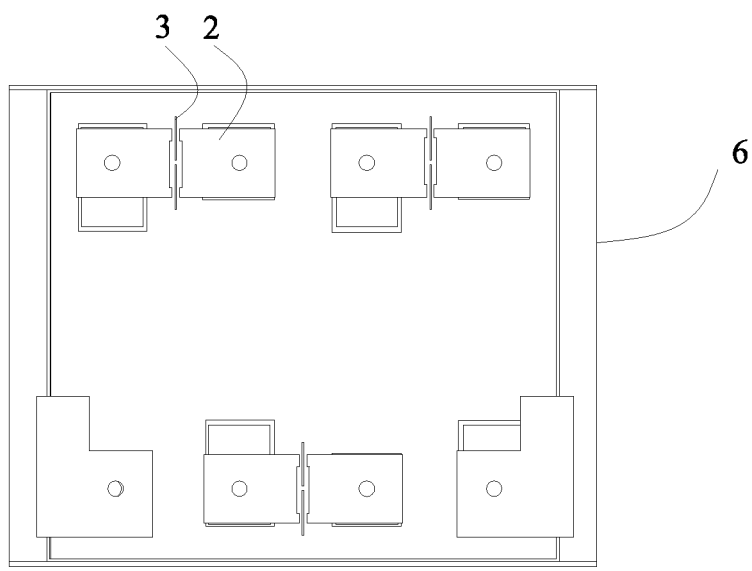
FIG. 37 is a top view of FIG. 36.
Figure 38:
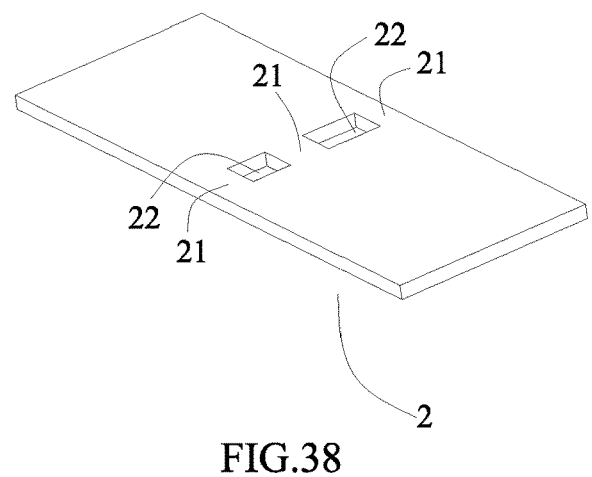
FIG. 38 is a varied example of the electrical connection sheet according to another embodiment of the present disclosure.
Figure 39:
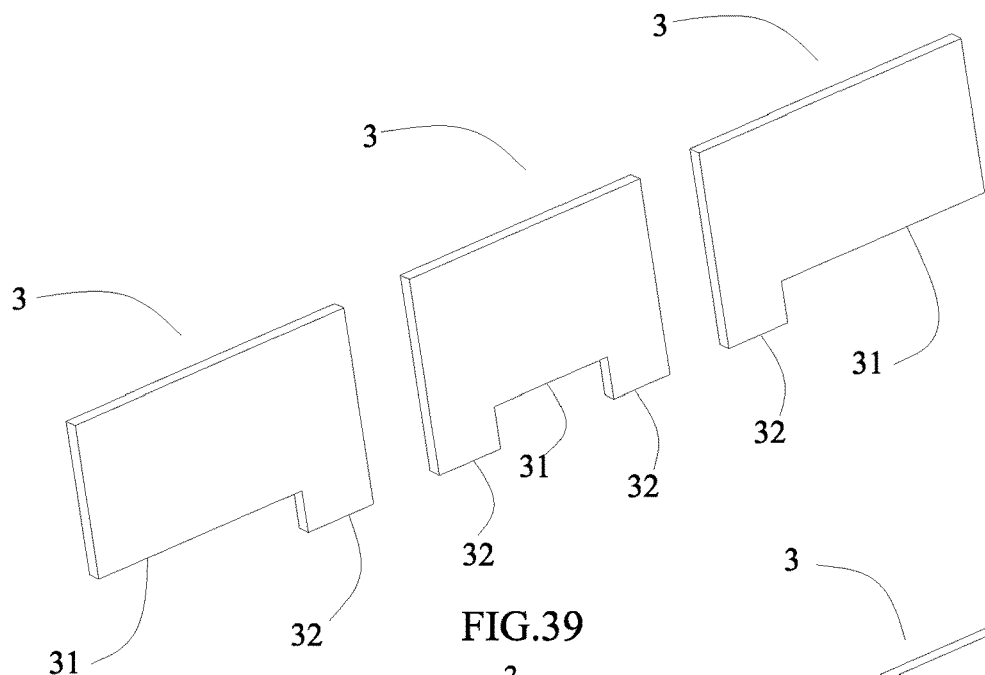
FIG. 39 is a schematic view of insulating sheets corresponding to the electrical connection sheet of FIG. 38.

As shown in FIG. 23 and FIG. 24, the electrical connection sheet 2 is provided with a through groove 22 which is between two adjacent fusing portions 21 and is between the two adjacent electrode terminals 11 connected by the electrical connection sheet 2, the through groove 22 extends along the width direction W of the electrical connection sheet 2 and passes through the electrical connection sheet 2 along the thickness direction T of the electrical connection sheet 2. Each insulating sheet 3 comprises: a supported portion 31 supported on the corresponding fusing portion 21 of the electrical connection sheet 2; and a protruding portion 32 protruding downwardly relative to the supported portion 31 and inserting into the corresponding through groove 22 of electrical connection sheet 2.

Figure 40:
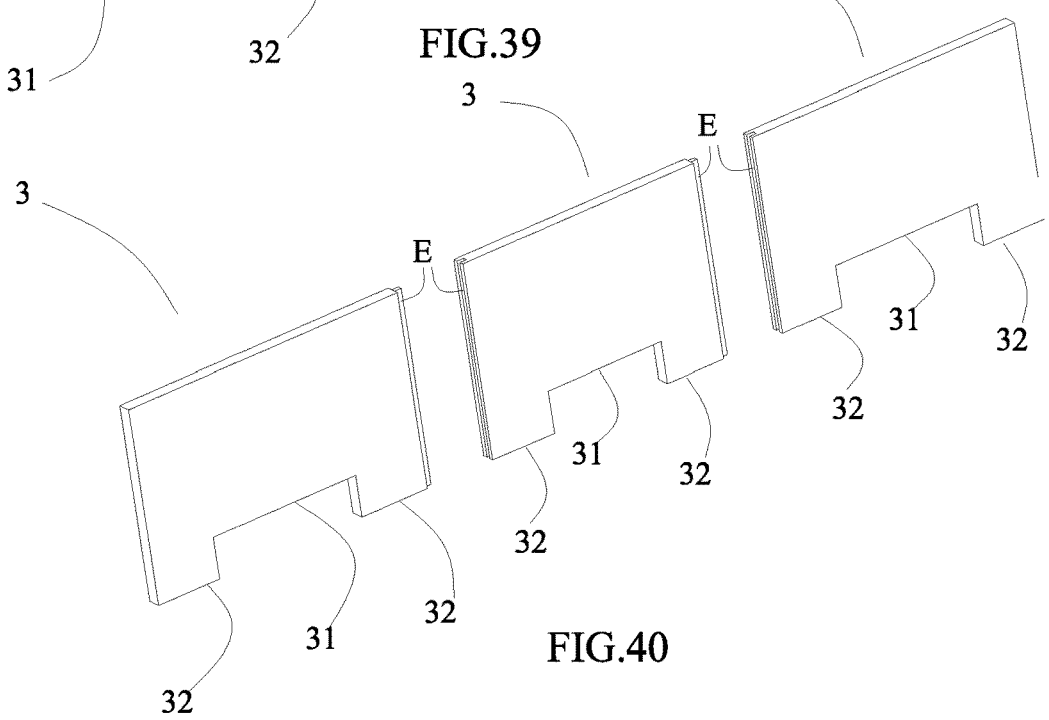
FIG. 40 is a varied example of the insulating sheets of FIG. 39.
Figure 41:
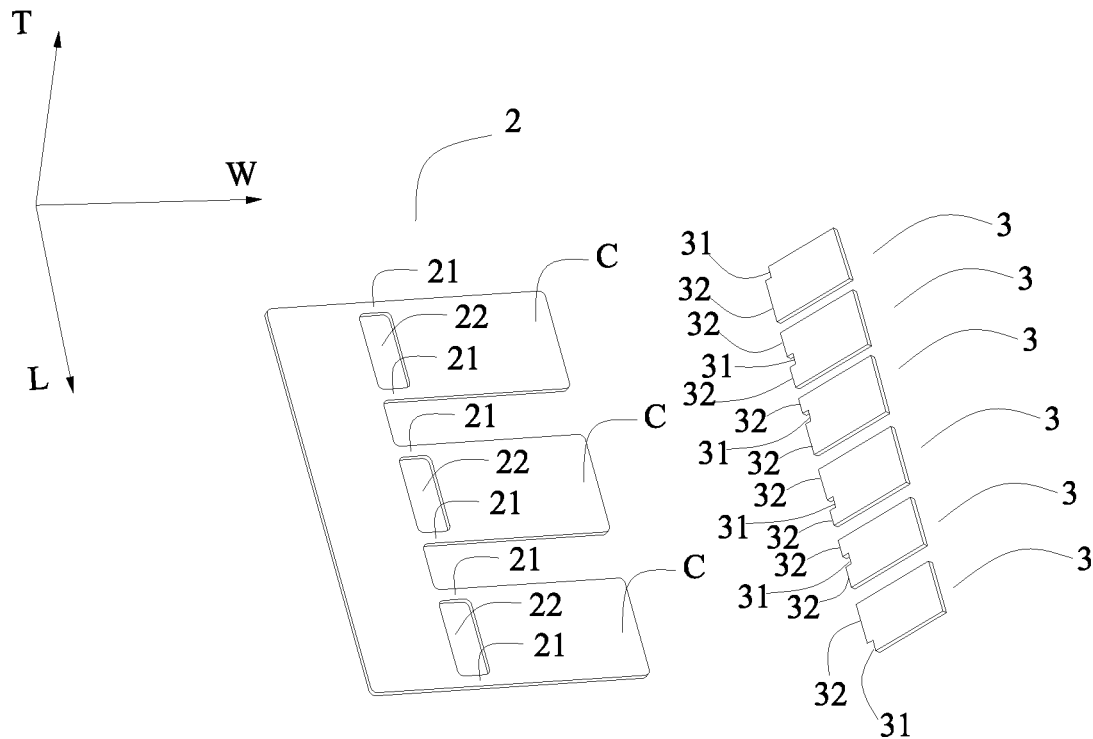
FIG. 41 is another varied example of the electrical connection sheet and the insulating sheet according to another embodiment of the present disclosure, in which the electrical connection sheet has a comb shape.
Figure 42:
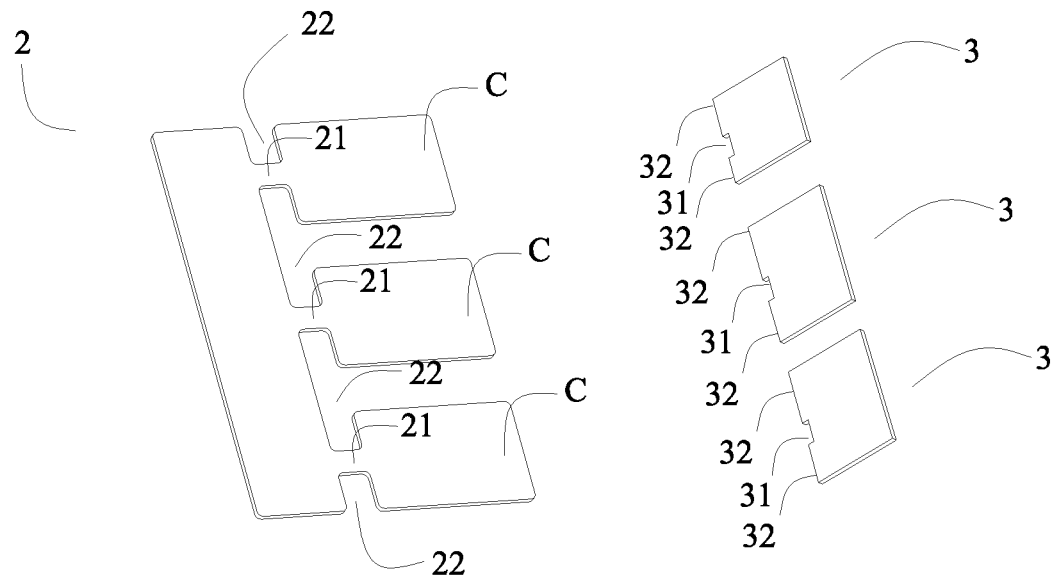
FIG. 42 is a variant of FIG. 41.

As shown in FIG. 40, the two adjacent insulating sheets 3 are connected by a concave-convex fit structure E, and the concave-convex fit structure E has clearance fit so as to allow that the two adjacent insulating sheets 3 can slide up and down relative to each other.

As to a shape of the electrical connection sheet, as shown in FIGS. 2-20 and FIGS. 23-38, the electrical connection sheet 2 may be a plate shape, positions where the electrical connection sheet 2 connects at least two electrode terminals 11 are arranged along a length direction L of the electrical connection sheet 2, and all the fusing portions 21 are arranged along the width direction W of the electrical connection sheet 2.

As shown in FIG. 21, FIG. 22, FIG. 41 and FIG. 42, the electrical connection sheet 2 may also be a comb shape having teeth C, each tooth C extends along the width direction W of the electrical connection sheet 2 and is electrically connected to one corresponding electrode terminal 11, and all the fusing portions 21 are arranged along the length direction L of the electrical connection sheet 2.

As shown in FIG. 1, FIG. 2 and FIG. 23, the battery module of the present disclosure further comprises: an insulating spacer 4 provided above the mono-batteries 1 and making the electrode terminals 11 of all the mono-batteries 1 exposed upwardly, when the insulating sheet 3 drops into the fracturing slit B which is formed after the corresponding fusing portion 21 is fused, the insulating sheet 3 can be supported on the insulating spacer 4; an upper cover 5 provided with a receiving groove 51 to receive an end portion of the corresponding insulating sheet 3 with clearance fit; a frame 6 receiving the plurality of mono-batteries 1 and assembled with the upper cover 5; and a base plate 7 assembled on a bottom of the frame 6 and supporting the plurality of mono-batteries 1.

What is claimed is:

1. A battery module, comprising:
   a plurality of mono-batteries arranged side by side, each mono-battery having electrode terminals which are opposite in electrical polarity; and
   an electrical connection sheet connecting at least two corresponding electrode terminals, the electrical connection sheet being formed with at least one fusing portion, each fusing portion being positioned between two adjacent electrode terminals connected by the electrical connection sheet;
   wherein
   the battery module further comprises: an insulating sheet supported on the fusing portion which is positioned between the two adjacent electrode terminals connected by the electrical connection sheet, when the fusing portion supporting the insulating sheet is fused and in turn a fracturing slit is formed, the insulating sheet drops into the fracturing slit to electrically isolate two facing sides of the electrical connection sheet which are at the fracturing slit, wherein the battery module further comprises:
an insulating spacer provided above the plurality of mono-batteries and making the electrode terminals of all the mono-batteries exposed upwardly;
when the insulating sheet drops into the fracturing slit which is formed after the corresponding fusing portion is fused, the insulating sheet can be supported on the insulating spacer.

2. The battery module according to claim 1, wherein one insulating sheet is provided between the two adjacent electrode terminals connected by the electrical connection sheet, the insulating sheet is supported on all the fusing portions which are between the two adjacent electrode terminals connected by the electrical connection sheet.

3. The battery module according to claim 2, wherein the electrical connection sheet is provided with a through groove which is adjacent to the fusing portion and between the two adjacent electrode terminals connected by electrical connection sheet, the through groove extends along a width direction of the electrical connection sheet and passes through the electrical connection sheet along a thickness direction of the electrical connection sheet;
the insulating sheet comprises:
  a supported portion supported on the fusing portion of the electrical connection sheet; and
  a protruding portion protruding downwardly relative to the supported portion and inserting into the through groove of the electrical connection sheet.

4. The battery module according to claim 1, wherein a plurality of insulating sheets are provided between the two adjacent electrode terminals connected by the electrical connection sheet, each insulating sheet is supported on one fusing portion or a plurality of fusing portions between the two adjacent electrode terminals connected by the electrical connection sheet.

5. The battery module according to claim 4, wherein the electrical connection sheet is provided with a through groove which is between two adjacent fusing portions and is between the two adjacent electrode terminals connected by the electrical connection sheet, the through groove extends along a width direction of the electrical connection sheet and passes through the electrical connection sheet along a thickness direction of the electrical connection sheet;
each insulating sheet comprises:
  a supported portion supported on the corresponding fusing portion of the electrical connection sheet; and
  a protruding portion protruding downwardly relative to the supported portion and inserting into the corresponding through groove of the electrical connection sheet.

6. The battery module according to claim 4, wherein two adjacent insulating sheets are connected by a concave-convex fit structure, and the concave-convex fit structure has clearance fit so as to allow that the two adjacent insulating sheets can slide up and down relative to each other.

7. The battery module according to claim 2, wherein the electrical connection sheet has a plate shape, positions where the electrical connection sheet connects the at least two electrode terminals are arranged along a length direction of the electrical connection sheet, and all the fusing portions are arranged along a width direction of the electrical connection sheet.

8. The battery module according to claim 4, wherein the electrical connection sheet has a plate shape, positions where the electrical connection sheet connects the at least two electrode terminals are arranged along a length direction of the electrical connection sheet, and all the fusing portions are arranged along a width direction of the electrical connection sheet.

9. The battery module according to claim 2, wherein the electrical connection sheet has a comb shape having teeth, each tooth extends along a width direction of the electrical connection sheet and is electrically connected to one corresponding electrode terminal, and all the fusing portions are arranged along a length direction of the electrical connection sheet.

10. The battery module according to claim 4, wherein the electrical connection sheet has a comb shape having teeth, each tooth extends along a width direction of the electrical connection sheet and is electrically connected to one corresponding electrode terminal, and all the fusing portions are arranged along a length direction of the electrical connection sheet.

11. The battery module according to claim 1, wherein the battery module further comprises:
an upper cover provided with a receiving groove to receive an end portion of the corresponding insulating sheet with clearance fit.

* * * * *